2,989,496
PROCESS FOR STABILIZATION OF VINYL CHLORIDE PLASTICS CONTAINING EXTRUDABLE PLASTICIZERS AND STABILIZED PRODUCT THEREOF
William E. Palm, Philadelphia, and Lee P. Witnauer, Oreland, Pa., assignors to the United States of America as represented by the Secretary of Agriculture
No Drawing. Filed May 21, 1956, Ser. No. 586,330
4 Claims. (Cl. 260—30.4)
(Granted under Title 35, U.S. Code (1952), sec. 266)

A non-exclusive, irrevocable, royalty-free license in the invention herein described, for all governmental purposes, through the world, with power to grant sublicenses for such purposes, is hereby granted to the Government of the United States of America.

This invention relates to a process for stabilizing plasticized vinyl chloride plastics and to plastics so stabilized.

Many plasticizers otherwise useful and satisfactory for use in vinyl chloride resins have the undesirable property of exuding from the plastic after long periods of time and particularly, after exposure to sunlight. Since the prediction of such behavior is impossible, it is common practice to conduct extended aging and weathering tests on the plasticized resins. A quicker and generally reliable test to determine whether the plasticizer will exude from a given plastic is to expose a sample to intense ultraviolet (U.-V.) light. Exudation will generally occur within a few minutes to a few hours instead of the weeks or months required in a natural weathering test.

Heretofore, no method was known for preventing the exudation of those plasticizers prone to exude, and the only recourse was to avoid their use, no matter how desirable their other properties might be.

An object of this invention is to provide stabilizers that, when used in small proportions in vinyl chloride plastics, will prevent the exudation of certain plasticizers that otherwise would exude. Another object is to provide plasticized vinyl chloride resin compositions that are stabilized against exudation of the plasticizer.

By the term vinyl chloride resin we mean any polymer or copolymer comprising a significant amount of polymerized vinyl chloride. By vinyl chloride plastic we mean a plasticized vinyl chloride resin. The vinyl chloride resins requiring plasticization usually contain a predominant amount of polymerized vinyl chloride, generally in the range of 80 to 100%. It is to this class of resins that our invention is particularly directed.

According to the invention, vinyl chloride resins plasticized with certain plasticizers that tend to exude and which are selected from the group consisting of hexyl epoxystearate, butyl triacetoxystearate, tributoxyethyl phosphate, di-2-ethylhexyl sebacate, and di-2-ethylhexyl azelate, are stabilized and exudation of plasticizer is prevented by incorporating into the plasticized resin about 0.2 to 2% of phenyl-β-naphthylamine (PBNA) having the formula

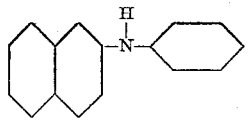

or ethylphenylethanolamine (EPEA) having the formula

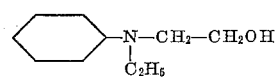

The stabilizers of this invention may be incorporated into the plastic in any convenient manner, such as by milling or by dissolving it in the plasticizer before adding the latter to the resin.

The following examples illustrate the practice of the invention. The resin used was a 95:5 copolymer of vinyl chloride and vinyl acetate. The plasticizer (35%, based on plastic) and stabilizer were milled into the resin simultaneously on a 2-roll mill at 300° F., after which 6" x 6" x 0.07" sheets were molded at 300° F. Stability to U.-V. light was determined by irradiating the sheets with light from a Type 7420 Hanovia U.-V. lamp (500 watt) placed 9 inches above the sample while the temperature of the latter was maintained at 85° C. during the irradiation. After 5 hours of irradiation the samples were cooled and examined for exudation of plasticizer. Results of some typical experiments are shown in Table I.

TABLE I

*Stabilizers in vinyl chloride plastics*

| Example | Stabilizer, Prcent | Plasticizer | Exudation |
|---|---|---|---|
| 1 | PBNA, 5 | Hexyl epoxystearate | None. |
| 2 | PBNA, 1 | ___do___ | Do. |
| 3 | PBNA, 0.5 | ___do___ | Do. |
| 4 | PBNA, 0.25 | ___do___ | Slight. |
| 5 | None | ___do___ | Heavy. |
| 6 | EPEA, 1 | ___do___ | None. |
| 7 | EPEA, 0.5 | ___do___ | Do. |
| 8 | EPEA, 0.25 | ___do___ | Slight. |
| 9 | EPEA, 0.5 | Butyl triacetoxystearate | None. |
| 10 | None | ___do___ | Moderate. |
| 11 | PBNA, 0.5 | ___do___ | None. |
| 12 | PBNA, 0.5 | Tributoxyethyl phosphate | Do. |
| 13 | None | ___do___ | Heavy. |
| 14 | EPEA, 0.5 | ___do___ | None. |
| 15 | EPEA, 0.5 | di-2-ethylhexyl sebacate | Do. |
| 16 | None | ___do___ | Heavy. |
| 17 | PBNA, 0.5 | ___do___ | None. |
| 18 | PBNA, 0.5 | di-2-ethylhexyl azelate | Do. |
| 19 | None | ___do___ | Heavy. |
| 20 | EPEA, 0.5 | ___do___ | None. |

Results similar to those shown in Table I are obtained when other plasticizers that tend to exude are used instead of those shown, or when other percentages of plasticizer are used, or when such plastizers are used in other vinyl chloride resins, particularly those containing a preponderant amount of vinyl chloride.

The accelerated aging test used in obtaining the data in Table I is a severe one, far exceeding the normal exposure that most plastics receive during their usual service life. For this reason, the amount of stabilizer that is required in a given plastic composition may be considerably less than the amount required to give complete protection from exudation under our test conditions. Thus, about 0.2% of either PBNA or EPEA will give significant protection for most vinyl chloride compositions for ordinary usage. On the other hand, for very severe requirements, as much as 25%, or even more, of the stabilizer may be used.

We claim:

1. A resin, containing polymerized vinyl chloride, which has been plasticized with a plasticizer having a tendency to exude and selected from the group consisting of hexyl epoxystearate, butyl triacetoxystearate, tributoxyethyl phosphate, di-2-ethylhexyl sebacate, and di-2-ethylhexyl azelate, having incorporated therein about 0.2% to 2%, by weight, based on the plasticized resin, of a stabilizer selected from the group consisting of phenyl-β-naphthylamine and ethylphenylethanolamine for said plasticized resin against exudation of the plasticizer.

2. A vinyl chloride resin, comprising a copolymer of vinyl acetate and at least about 80% of vinyl chloride, which has been plasticized with a plasticizer having a tendency to exude and selected from the group consisting of hexyl epoxystearate, butyl triacetoxystearate, tributoxyethyl phosphate, di-2-ethylhexyl sebacate, and di-2-ethylhexyl azelate, having incorporated therein about 0.2% to 2%, by weight, based on the plasticized resin, of a stabilizer selected from the group consisting of phenyl-β-naphthylamine and ethylphenylethanolamine for said plasticized resin against exudation of the plasticizer.

3. A process of stabilizing a resin, containing polymerized vinyl chloride, which has been plasticized with a plasticizer having a tendency to exude and selected from the group consisting of hexyl epoxystearate, butyl triacetoxystearate, tributoxyethyl phosphate, di-2-ethylhexyl sebacate, and di-2-ethylhexyl azelate, comprising incorporating into the said plasticized resin about 0.2% to 2%, by weight, based on the plasticized resin, of a stabilizer selected from the group consisting of phenyl-$\beta$-naphthylamine and ethylphenylethanolamine for said plasticized resin against exudation of the plasticizer.

4. A process of stabilizing a vinyl chloride resin, comprising a copolymer of vinyl acetate and at least about 80% of vinyl chloride, which has been plasticized with a plasticizer having a tendency to exude and selected from the group consisting of hexyl epoxystearate, butyl triacetoxystearate, tributoxyethyl phosphate, di-2-ethylhexyl sebacate, and di-2-ethylhexyl azelate, comprising incorporating into the said plasticized resin about 0.2% to 2%, by weight, based on the platicized resin, of a stabilizer selected from the group consisting of phenyl-$\beta$-naphthylamine and ethylphenylethanolamine for said plasticized resin against exudation of the plasticizer.

References Cited in the file of this patent
UNITED STATES PATENTS 2,588,899    Voorthuis et al. _____ Mar. 11, 1952